3,536,308
CONDITION RESPONSIVE FLUID CONTROL
ARRANGEMENT FOR A CLOTHES DRYER
Frederick M. White, Louisville, Ky., assignor to General
Electric Company, a corporation of New York
Filed Sept. 12, 1968, Ser. No. 759,421
Int. Cl. F27b 7/00
U.S. Cl. 263—33      12 Claims

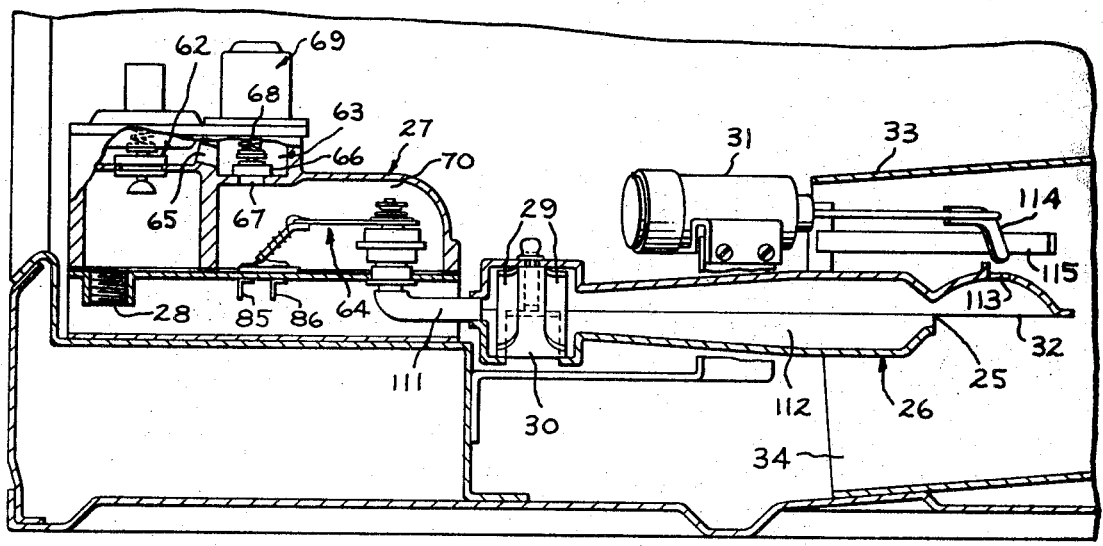
FIG.2
FIG.3
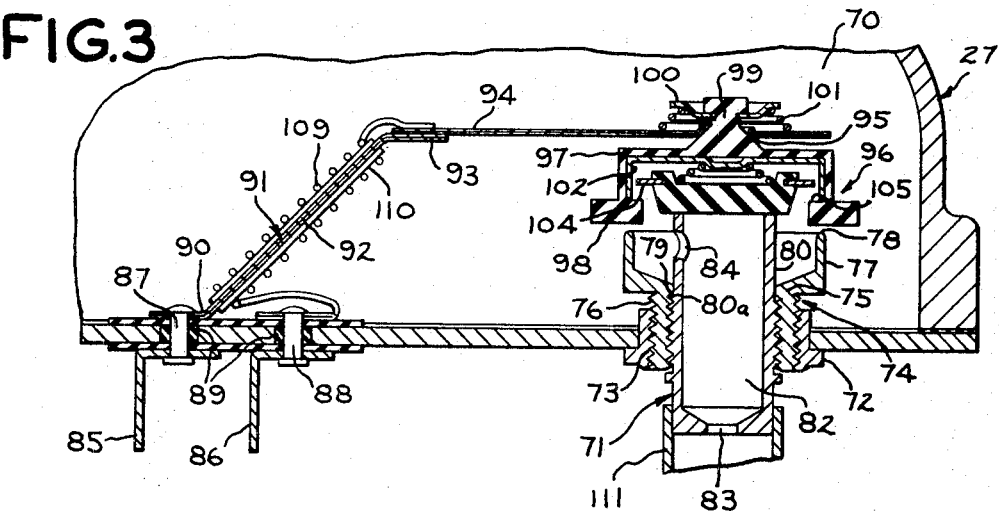
FIG.4
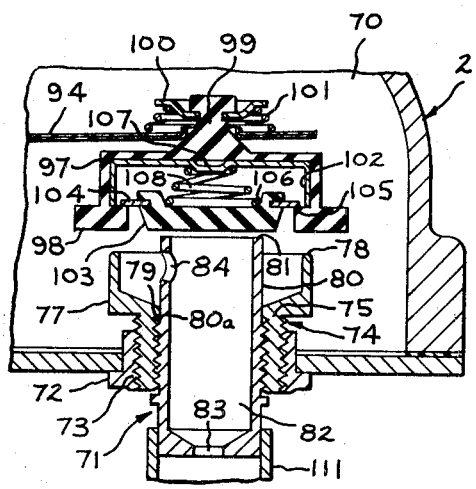
INVENTOR.
FREDERICK M. WHITE
BY
HIS ATTORNEY United States Patent Office 3,536,308
Patented Oct. 27, 1970

ABSTRACT OF THE DISCLOSURE

A control system for a clothes dryer having a gas fueled heater includes a gas flow control valve with a bimetal actuator for controlling the flow of gas through the valve. The heater for the bimetal is connected in parallel with a negative coefficient temperature responsive resistance, which is physically placed to sense a temperature responsive to the fabrics being dried. A control switch is connected in series with this combination and includes a series connected heater for a bimetal switch arm. A manual adjustment means is provided for setting the initial open-to-closed ratio of the control switch.

BACKGROUND OF THE INVENTION

There are many applications for gas or fluid fueled heaters in which it is desired to control the heat input to the device in response to the temperature of the material being treated. For instance, it is well known in the fabric drying art that, as the fabrics approach dryness, their temperature rises. Therefore, as the fabrics approach dryness it is desirable to cut down the amount of heat being provided to prevent overheating the fabrics and thereby harming the material. Also, it is desirable automatically to turn off the dryer when the fabrics reach a temperature corresponding to the appropriate dry condition.

Accordingly, it is an object of the present invention to provide a new and improved control system for a gas or fluid fueled device which control system is responsive to the temperature of the material being treated.

It is a further object of this invention to provide such a control system which is simple in design and involves a minimum number of low-cost parts.

It is another object of this invention to provide such a control system for a fabric drying machine which controls the amount of heat provided to the machine in response to the temperature of the fabrics being treated.

SUMMARY OF THE INVENTION

In carrying out this invention, in one form thereof, there is provided, for use with a fluid fueled heating device, including a valve for controlling the fluid bow; a control arrangement for the valve comprising a bimetal actuator for moving the valve between open and closed positions, including electrically operated heating means for causing deflection of the bimetal. A circuit is provided for connecting the heating means to a source of electric energy and a variable resistor is connected in the circuit in parallel with the heating means. The circuit further includes impedance means in series with the parallel connected heating means and variable resistors. The resistor is positioned to sense a temperature responsive to the material being heated and has a value inversely proportional to the sensed temperature. Thus, as the temperature of the heated material rises, the resistance of the resistor decreases, causing the voltage across it and the heating means to decrease. The heat supplied by the heating means to the bimetal valve actuator thereby is decreased and the valve is caused to move toward its closed position.

BRIEF DESCRIPTION OF THE DRAWINGS

FIG. 2 is an enlarged, fragmentary side elevational view of a portion of the machine in FIG. 1, the view being partly broken away and partly in section to illustrate details;

FIG. 3 is an enlarged view of a portion of the control apparatus of FIG. 2, illustrating the control valve in its partially open position;

FIG. 4 is a partial, enlarged view similar to FIG. 3, showing the control valve in its fully opened position;

DESCRIPTION OF THE PREFERRED EMBODIMENT

Figure 1:
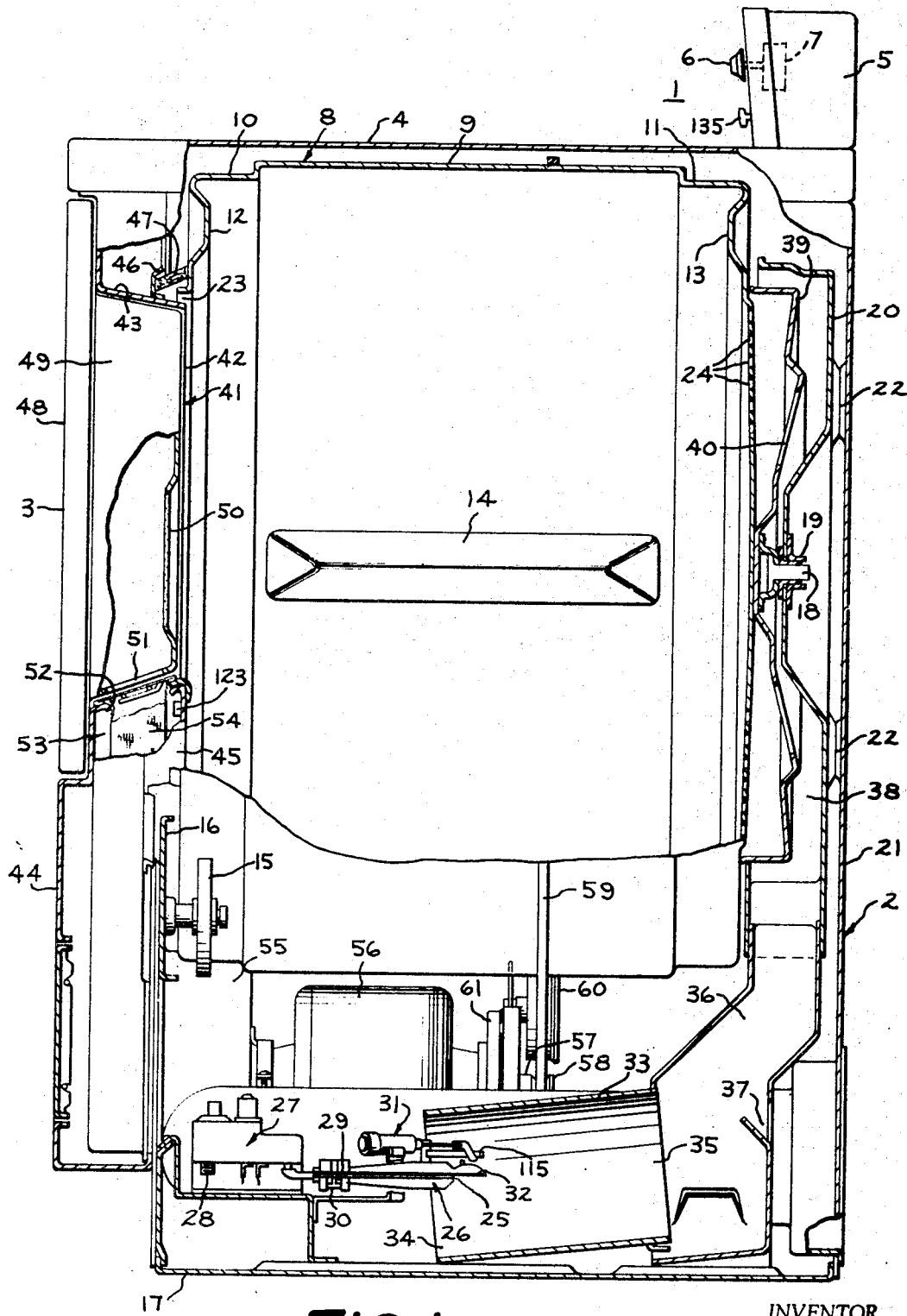
FIG. 1 is a side elevational view of a clothes dryer suitable for incorporation of the improved control of the present invention, the view being partly broken away and partly in section to illustrate details.

Referring now to FIG. 1, the machine illustrated is a domestic fabric or clothes dryer generally indicated by the numeral 1. Dryer 1 includes a cabinet 2 having a front door 3 to provide access to the interior of the cabinet for loading and unloading clothes. Provided on the top 4 of cabinet 2 is a control panel 5, which may, in a conventional way, include a suitable manual control 6 connected to a control assembly 7 mounted in the panel 5. By manual setting of control 6, the machine may be caused to start and automatically proceed through a cycle of operation.

Within cabinet 2, there is provided a clothes tumbling chamber, or drum, 8. Drum 8 is substantially cylindrical in shape, having a center cylindrical wall portion 9, and outer cylindrical wall portions 10 and 11 located respectfully adjacent an annular front wall 12 and a circular rear wall 13 of the drum. Wall portions 9, 10 and 11 are imperforate over their entire area so that the outer shell of the drum is imperforate. On the interior surface of wall portion 9 there are a plurality of clothes tumbling ribs 14 so that clothes are lifted up when the drum rotates, and then tumble back down to the bottom of the drum.

The front of the drum 8 may be rotatably supported within outer casing 2 by suitable idler wheels, one of which is indicated by the numeral 15. These wheels are rotatably secured to the top of a member 16 which extends up from the base 17 of the machine. The wheels 15 are disposed beneath the drum, in contact with portion 10, so as to support the portion 10 on each side to provide a stable support.

The rear end of drum 8 receives its support by means of a stub shaft 18 extending from the center of wall 13. Shaft 18 is secured within a bearing 19 formed in a baffle-like structure 20 which, in turn, is rigidly secured to the back wall 21 of the cabinet 2 by any suitable means such as welding at a number of points 22. With the arrangement shown, the drum may rotate on a horizontal axis, with rollers 15 providing the front support and stub shaft 18 within bearing 19 providing the rear support.

In order to provide for the flow of a stream of drying air through the clothes drum, the drum is provided with a central aperture 23 defined by the front wall 12 and with a plurality of perforations 24 in the rear wall 13. Perforations 24 in the present case are formed to extend around the rear wall in an annulus.

The air provided to the drum is heated by a gas flame which issues from the outlet 25 of a burner 26. Burner 26 receives a regulated supply of gas from a control valve assembly 27, the gas being supplied to the assembly 27 through a supply pipe or conduit (not shown) connected to the assembly inlet 28. In the conventional way, the primary air is drawn into the burner through an inlet opening 29, which is controlled by a shutter 30. The primary air and gas are mixed in the burner and are ignited by means of a conventional igniter generally indicated at 31. The gas flame is then spread out by the spreader 32 formed at the outlet end of the burner. This is located just within the combustion chamber 33 so that secondary air is drawn in through the end 34 of the chamber 33 and is heated to a high temperature.

The outlet end 35 of chamber 33 communicates with an upwardly extending duct 36 which is provided with additional air openings 37, as needed, in order to reduce the temperature of the air and gas mixture to an appropriate extent. The heated mixture (hereafter called heated air) then flows up through duct 36 and enters a generally circular heat diffuser chamber 38 formed between the member 20 and a baffle 39 which is rigidly secured to the outer surface of wall 13. Baffle 39 has openings 40 formed therein so that the heated air may flow from the chamber 38 through the openings 40 and perforations 24 into the drum 8.

The front opening 23 of the drum is substantially closed by means of a stationary bulkhead generally indicated by the numeral 41. Bulkhead 41 is made up of a number of adjacent members including the inner surface 42 of the access door 3, a stationary frame 43 formed as a flange of front wall 44 of the cabinet, the inner surface member 45 of an exhaust duct formed by the cooperation of member 45 and the front wall 44 of the cabinet, and an annular flange 46 mounted on the frame 43. It will be noted that a suitable clearance is provided between the inner edge of the aperture 23 and the edge of bulkhead 41 so that there is no rubbing between the drum and the bulkhead during rotation of the drum. In order to prevent a substantial air leakage through the aperture 23, a suitable ring seal 47 is secured to the flange 46 in sealing relationship with the exterior surface of the drum wall 12.

Central aperture 23, in addition to serving as part of the air flow passage to the drum, also serves as a means whereby clothes may be loaded into and unloaded from the drum. Door 3, whose inner surface forms part of the bulkhead closing the opening, is mounted on cabinet 2 so that when the door is open clothes may be inserted into and removed from the drum through the door frame 43. It will be noted that the door includes an outer, flat imperforate section 48 and an inwardly extending hollow section 49 mounted on the flat outer section. Hollow section 49 extends into the door frame 43 when the door is closed, and the door surface 42, which comprises part of the combination bulkhead 41, is actually the inner wall of the hollow section.

The air outlet from the drum is provided by a perforated opening 50 formed in the inner wall 42 of hollow door section 49. The bottom wall section of door 3 and the adjacent wall of door frame 43 are provided with aligned openings 51 and 52, opening 52 providing an entrance to duct 53 formed by the cooperation of member 45 with front wall 44. A lint trap 54 is positioned in the exhaust duct 53 and opening 52 and is supported by the door frame 43. Duct 53 leads downwardly and communicates with a housing 55. Housing 55 contains a blower (not shown) which is directly driven by motor 56. The blower draws heated air through the duct 54 and then exhausts it from the cabinet 2 through an appropriate duct (not shown).

In addition to driving the blower, motor 56 constitutes the means for effecting rotation of drum 8. In order to effect this rotation, motor 56 is provided with a shaft 57 having a small pulley 58 formed at one end thereof. A belt 59 extends around the pulley 58 and also entirely around the wall section 9 of drum 8. The relative circumferences of the pulley 58 and the wall section 9 cause the drum to be driven by the motor at a speed suitable to effect tumbling of clothes therein. In order to effect proper tensioning of the belt 59, a suitable idler assembly 60 is secured to the same support 61 which supports one end of the motor. Thus, the air is pulled through the drum and, at the same time, the fabrics in the drum are tumbled. The air is heated by the flame that is emitted by the burner 26. The heated air passing through the drum causes vaporization of moisture from the clothes. The vapor is carried off with the air as it passes out of the machine.

Referring now to FIGS. 2–4, there is shown in more detail the control valve assembly for providing a regulated flow of gas into the dryer. The flow control assembly 27 is formed and constructed so that a pressure regulator 62, a solenoid valve 63, and a bimetal actuated valve 64 are serially arranged in the flow path for the gas.

In a conventional manner the regulator 62 functions to provide a relatively constant pressure stream of gas regardless of variations in the pressure of the gas entering inlet 28. From the flow regulator the gas will flow through an opening 65 to the inlet side of the solenoid valve 63. The solenoid valve includes a plunger 66 which is biased against an opening 67 by a spring 68. A solenoid generally indicated at 69 is positioned around the plunger 66, and, when energized, will raise the plunger against the force of the spring 68 so as to expose the opening 67 for gas flow therethrough into a chamber 70, which surrounds the bimetal valve 64. As is conventional, the solenoid valve is designed so that, when a first relatively high voltage is applied to the solenoid it will cause the plunger to lift and, thereafter, the continued application of a lower value holding voltage will keep the plunger lifted. When the voltage falls below this holding value, the plunger will be forced closed quickly by the spring 68 to shut off the flow of gas.

As best seen in FIGS. 3 and 4, a suitable outlet 71 is provided from the chamber 70 by means of a bushing 72 which is mounted in and extending through the housing 27 in fluid tight relationship thereto. The bushing 72 is provided with internal threads 73 to receive a composite valve seat arrangement generally indicated at 74. The valve seat arrangement includes an outer, hollow stud or tube 75 which is provided with external threads 76 for cooperation with the threads 73 to mount the stud 75 within the bushing 72. The inner end of the stud 75 terminates in a tubular wall portion 77 forming a circular valve seat 78.

The stud 75 also is provided with internal threads 79. An inner, hollow stud or shaft 80 is provided with external threads 80a for cooperation with the threads 79 to mount the inner stud within the outer stud. The inner end of the stud 80 defines an inner annular seat 81. With this arrangement the positioning of both the outer and inner valve seats may be varied or adjusted for suitable purposes such as calibration. The inner surface of the stud 80 provides an outlet conduit 82 which terminates in an outlet or main orifice 83. The side wall of the stud 80 is provided with a second or series orifice 84 through which gas may flow even when the inner seat 81 is closed.

A pair of electrical terminals 85 and 86 are mounted on the housing and insulated therefrom and are secured to the housing by means of conductive rivets, 87 and 88 respectfully. The rivets extend through the housing and are insulated therefrom by bushings 89 and the inner end of each rivet is insulated from the housing by a suitable sheet of insulating material.

One end 90 of a control bimetal 91 is connected to the inner end of the rivet 87. The bimetal also includes a mid portion 92 which extends inwardly away from the end 90 and terminates in an opposite end 93, which is bent from the mid portion so as to extend toward the valve seat arrangement. One end of an ambient compensating bimetal or leaf spring 94 is attached to the end 93 of the control bimetal by some suitable means such as spot welding. From the control bimetal, the leaf spring extends to a point at least in alignment with the valve seat arrangement 74. At this position it is provided with an opening 95 by means of which a suitable valve assembly, generally indicated 96, is mounted to the leaf spring 94.

The valve assembly includes an outer valve portion 97 which is of a generally cup-shaped configuration and is provided with a lower edge or wall 98 disposed to engage the outer valve seat 78 so as to prevent flow over this seat. Substantially in alignment with the outlet conduit 82, the outer valve portion 97 includes a center post 99 which extends away from the valve seat assembly and through the opening 95 in the leaf spring. A cup-like disk 100 is mounted on the post, on the opposite side of the leaf spring from the valve seat assembly, and a coil spring 101 is received between the disk and the leaf spring 94. This mounts the outer valve portion on the leaf spring but with some degree of freedom of movement therebetween.

The outer valve portion 97 is hollow and includes a cup-like reinforcing or stiffening member 102. A second or inner valve portion 103 is received in the hollow interior of the outer valve portion and is sufficiently large to overlie the valve seat 81 to close all flow over the inner valve seat when the inner valve portion engages it. A ring shaped member 104 of stiff material extends outwardly from the inner valve portion and overlies a ledge 105 provided on the radially inner side of the outer valve portion 97.

The top of the inner valve portion is provided with a recess 106 and reinforcing member 102 is provided with an aligned embossment 107. A coil spring 108 is mounted between the recess 106 and embossment 107. This coil spring helps to maintain the inner valve portion centered within the outer valve portion and, as the outer valve portion begins to open, that is move away from the valve seat assembly, the spring keeps the inner valve portion firmly seated against the inner valve seat until the ring member 104 is engaged by the ledge 105 to move the inner valve portion away from the inner valve seat.

An insulated heating wire 109 is wound about the center or mid portion 92 of the bimetal 91 and is separated therefrom by a sheet 110 of an insulating material. One end of the wire 109 is connected to the rivet 88 while the other end is connected to the leaf spring 94. Since the leaf spring is connected to bimetal 34, which is connected to the rivet 87, a circuit is completed from the terminal 85 to the terminal 86.

Figure 5:
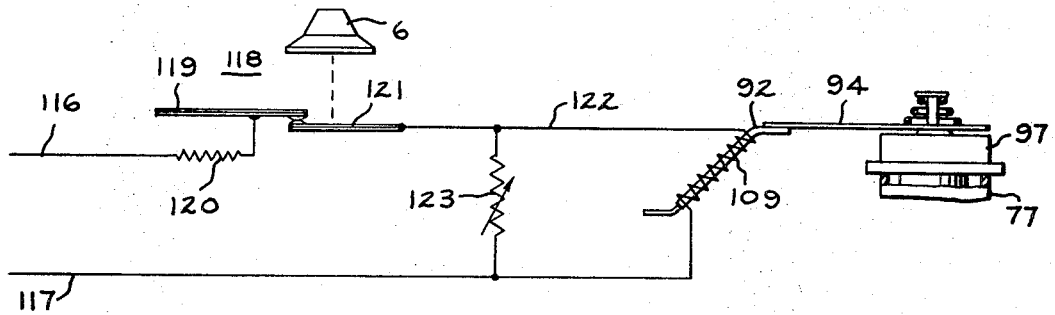
FIG. 5 is a schematic electrical circuit diagram illustrating one embodiment of the control circuit using present invention.
Figure 6:
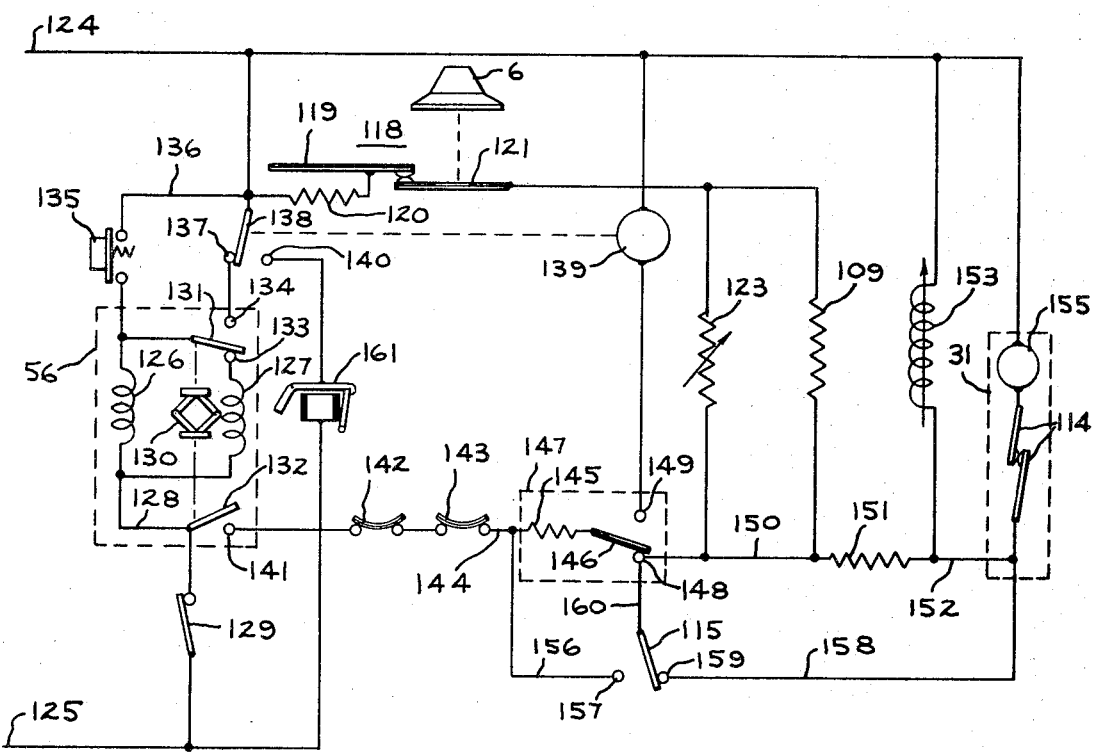
FIG. 6 is a schematic circuit diagram of a control circuit for the fabric dryer of FIG. 1, incorporating the circuit of FIG. 5.

As a current from a suitable control circuit, such as those shown in FIGS. 5 and 6, passes through the wire 109 and bimetal 91, the bimetal begins to heat and deflect in a counterclockwise direction, as seen in the drawings. This tends to move the leaf spring counterclockwise and this movement causes the coil spring 101 to be compressed and the leaf spring to be flexed, since the gas pressure within the chamber 70 tends to hold the outer valve portion 97 closed. After a first predetermined movement of the bimetal, the force built up in the members 94 and 101 will be sufficient to cause the outer valve portion 97 to snap open, that is to snap away from the outer valve seat 78. When this occurs gas flows over the outer seat 78, through the series orifice 84, the outlet conduit 82 and the main orifice 83 to an outlet tube 111. With this partial opening of the valve assembly the orifices 83 and 84 effectively control the gas flow so that a predetermined rate of flow is provided.

Continued heating of the bimetal 91 causes it to continue to bend in a counterclockwise direction so as to continue to move the outer valve portion 97 away from the valve seat assembly 74. During this movement the spring 108 holds the inner valve portion 103 against the inner valve seat 81. After an additional predetermined amount of movement, the ledge 105 engages the ring member 104 and forcefully lifts the valve portion 103 away from the inner valve seat 81. When this occurs, gas may flow from the chamber 70 over the outer valve seat 78 and then follow two paths. The first of these is through the series orifice 84 to the outlet conduit 82, and the other is over the inner valve seat 81 to the outlet conduit 82. With the inner valve portion removed from the inner valve seat, the maximum fluid flow is determined by the main orifice 83 and a change in the effective heating of the bimetal 91 so that the spacing of the inner valve portion 103 from the inner valve seat 81 will effectively change the rate of gas flow from the valve assembly until this maximum flow rate is reached.

Many valves are known which may be used with the control circuit of the present invention to provide a flow rate in response to the temperature of the material being treated. The particular valve arrangement has been shown for illustrative purposes as it is particularly suitable for use with the present invention. It is described in more detail in applican't co-pending application Ser. No. 759,451, filed Sept. 12, 1968, and assigned to the assignee of the instant invention.

The outlet tube 111 connects the valve assembly 27 to the burner 26 so that the gas emitted from valve assembly will be provided to the inlet end of the burner, where it is mixed with primary air drawn in through opening 29 of the burner. This air and gas mixture flows through a venturi tube 112 to the outlet 25 of the burner. A portion of the air and gas mixture will flow through a bleed opening 113 provided in the top of the burner and impinge upon the contacts 114 of the igniter 31. When the igniter is energized, a spark will be caused between the contacts 114 and will ignite this bleed mixture, which, in turn, will ignite the main flow of the air and gas mixture. Upon ignition most of the flame flows across the lower edge of the flame spreader 32 while a small detector flame flows through the bleep opening 113 and impinge upon a flame detector 115.

Referring now to FIG. 5 there is shown a basic control circuit for adjusting the supply of gas to the burner in response to the temperature of the material being heated. More particularly, the circuit shown is adapted to provide a high initial heat input to a fabric dryer during the initial stage of the drying so as to obtain maximum evaporation of moisture from the fabrics without overheating or damaging the fabrics themselves and then to reduce the heat input to the dryer as the fabrics become dry and their temperature rises. The circuit includes a pair of conductors 116 and 117 which are adapted to connect the circuit to a suitable source of electric energy such as the normal household power supply to which domestic clothes dryers are connected. Such a source of electric energy will apply a voltage of substantially constant magnitude across the conductors 116–117.

The circuit includes a control switch 118 having a moveable bimetal arm 119, a heater 120 for the bimetal arm and an adjustable, ambient compensating bimetal arm 121. The heater 120 is connected at one end to the conductor 116 and at the other end to the bimetal 119. The bimetal 119 is positioned to contact the ambient compensating bimetal arm 121. The other end of the compensating arm 121 is connected to a conductor 122, which, in turn, is connected to the heater 109 for the valve bimetal 92. The other end of heater 109 is connected to the conductor 117. Additionally, a variable resistance such as a negative temperature coefficient thermistor 123 is connected between the conductors 122 and 117 in parallel circuit relation with the heater 109. As illustrated in FIG. 1, the thermistor 123 is positioned in the exhaust duct 53 so as to be responsive to the temperature of the air being exhausted from the machine. The temperature of this exhaust air is responsive to the temperature of the fabrics being dried in the machine. Since the thermistor 123 has a negative temperature coefficient, the higher the exhaust temperature (and correspondingly the fabric temperature) becomes, the lower the resistance value of the thermistor. A suitable manual control may be provided for setting the initial spacing of the compensating arm 121 with respect to the heated bimetal 119. This control may take the form of the manual control 6 in FIG. 1. This initial setting of the ambient compensating bimetal 121 will determine the initial relationship between the amount of time the bimetal arms of the switch 118 are connected and the amount of time they are disconnected.

The resistance of heater 120 and heater 109 are fixed while the resistance value of the thermistor 123 varies inversely with the temperature of the fabrics being dried. Initially the thermistor will have a high resistance while the clothes are wet and the exhaust temperature is low. At this time a large portion of the line voltage will be applied across the thermistor and valve heater 109, which are connected and parallel. The bimetal valve 64 will respond to this large voltage and be full open allowing a high gas flow to provide a high heat input into the dryer. As the clothes dry, their temperature increases and thus the exhaust temperature increases. This causes the thermistor resistance to decrease. As this occurs the voltage across the thermistor and the valve heater will decrease thereby reducing the heating current through the valve heater. This causes the valve to close partially and restrict the flow of gas through it. This reduces the heat input to the dryer.

The adjustable control switch 118 functions in connection with the thermistor 123 to provide a more sensitive and an adjustable control. Initially, the bimetal arms 119 and 121 are in contact so that current will flow through the circuit, including the heater 120. The heat from the heater 120 impinges on the bimetal arm 119 and eventually causes this bimetal to deflect and move out of contact with bimetal 121. The length of time required for this depends upon the initial setting provided by the manual control 6. When the two bimetal arms 119 and 121 separate, the circuit is interrupted and the heater 120 is effectively turned off. The bimetal arm 119 then cools and moves back into contact with arm 121 to again re-energize the entire circuit including heater 120. These contacts continue to cycle open and closed as just described and their cycle time is designed to be much faster than the cycle time of the valve 94 so that the cycling of the control switch 118 does not cause the bimetal arm 92 to close the valve.

The adjustment of the control knob 6 will determine the length of time the arms 119 and 121 are open relative to the amount of time they are closed and, therefore, the percentage of on time of the control. If the control knob is adjusted up, as seen in FIG. 5, the control cycle will have a higher percentage of on time. If the control knob is adjusted down, as seen in FIG. 5, the percentage of on time is reduced. This provides an adjustable throttling of the valve to control the heat input into the dryer. For instance, if a heavy load of fabrics are to be dried, the control 6 would be adjusted for a high percentage of on time. This will result in the bimetal valve heater 109 having a high average effective wattage applied to it and the valve initially will completely open.

As the clothes dry and the thermistor resistance decreases, which not only decreases the voltage across the valve heater 109, but also increases the voltage across the control heater 120. As the control heater voltage and, thus its effective wattage increases, the bimetal 119 will be heated more rapidly and will move away from the arm 121 more quickly. Thus, the time that arms 119 and 121 are closed will be shorter. The time that these arms will remain open, while arm 119 cools, stays basically the same. This results in decreasing the percentage of on time of the switch 118. This also decreases the overall percentage of on time of the valve heater 109. Thus, not only is a reduced voltage applied to the valve heater as a result of the reduced resistance of the thermistor 123, but also it is applied for a shorter time due to the reduction of the percentage of on time of the control switch 118. This effectively reduces the wattage or power of the heater 109 even more and makes the control system very sensitive to the dryness of the fabrics.

For a light clothes load the adjustable control knob 6 would be set for a lower initial percentage of on time of the switch 118. The principle of operation is basically the same as that just described for the heavy load of fabrics with the difference being that the heat is reduced quicker as it takes less heat to dry a smaller load of fabrics.

The adjustable control switch 118 serves an additional purpose. In the event the line voltage were to change, the voltage across the valve heater 109 would also change. This would tend to give a false input to the valve 94 and change the heat input to the dryer. However, the adjustable control switch 118 will compensate for this change in the line voltage. For example, if the line voltage increases above the designed value, the voltage across the heater 120 also will increase. This will cause arms 119 and 121 to open faster. The time required for them to close will remain essentially the same. This will reduce the percentage of on time of the entire control system and tend to maintain the designed average voltage across the valve heater 109.

Referring now to FIG. 6 there is shown a basic circuit for controlling the entire operation of a dryer such as that illustrated in FIG. 1, incorporating the valve control circuit of FIG. 5. The circuit includes a pair of conductors 124 and 125 adapted to connect the dryer to a suitable source of electrical energy. For domestic use this normally will be a 110 volt power supply. The dryer motor 56 is connected between the conductors 124 and 125 and is a single-phase, induction-type motor having a main winding 126 and a start winding 127, both connected at a common end to a conductor 128. The conductor 128 is connected through a door switch 129 to the conductor 125. The door switch is closed when the door 3 is closed and is open when the door is open.

The start winding 127 is connected and parallel with the main winding 126 under the control of a speed responsive device, such as that shown at 130, which normally is connected to the rotor of the motor. The speed responsive device controls a pair of switch arms 131 and 132. The switch arm 131 is in contact with a stationary contact 133 when the motor is at rest or rotating below a predetermined speed and moves into contact with a stationary contact 134 when the motor comes up to operating speed. It will be seen that engagement of the arm 131 with contact 133 connects the windings 126 and 127 in parallel while movement of the arm 131 away from the contact 133 disconnects the start winding. The starting of the motor is provided by a manually operable switch 135 which physically may be located in the back splasher 5 of the machine. The switch 135 connects the main motor to the supply conductor 124 through a conductor 136. When the switch 135 is closed the motor begins to rotate and quickly, normally within less than a second, the motor comes up to speed so that arm 131 moves from contact 133 to contact 134. This completes a circuit from the main winding 126 through the arm 131, contact 134, a contact 137 and a moveable arm 138 to the conductor 136. The arm 138 is under control of a timer motor 139 and may be moved by the timer motor to a contact 140 as will be explained herebelow. Thus, when the motor comes up to speed the main winding 126 is connected to the conductor 124 around the the push-to-start switch 135 so that the motor continues to run.

As the motor comes up to speed, the speed responsive device also causes the arm 132 to move into engagement with a stationary contact 141. From contact 141 a circuit extends through an inlet safety thermostat 142 and a blower thermostat 143 to a conductor 144. The inlet thermostat 142 is responsive to the temperature of the air flowing through inlet duct 36 and opens in the event of a malfunction causing the inlet air temperature to be excessive. The blower thermostat is responsive to the temperature of the air being exhausted to the machine and is set at a high temperature to open in the event of a malfunction causing the outlet temperature to become excessive.

From conductor 144 a branch circuit is connected to the heater 145 and bimetal arm 146 of a warp switch 147. The bimetal arm 146 normally engages a stationary contact 148. However, after a pre-determined period of heating by the heater 145 it moves from contact 148 to a contact 149. From contact 149 a circuit extends through a timer motor 139 to the supply conductor 124. The contact 148 is connected to a conductor 150. From conductor 150 a first circuit is completed through thermistor or negative temperature coefficient resistance 123, the compensating arm 121, the heated bimetal arm 119 and the heater 120 of the control switch 118 to the conductor 136. A second circuit extends from the conductor 150 through the valve bimetal heater 109 to the compensating arm 121 of the switch 118. A third circuit extends through a dropping resistor 151 to a conductor 152. From the conductor 152 one circuit extends through the operating coil 153 of the solenoid valve 63 to the conductor 124. Another circuit extends from conductor 152 through the sparking contacts 114 and motor 155 of the igniter 31 to the conductor 124.

The conductor 144 is also connected to a conductor 156 which terminates in a stationary contact 157. The conductor 152 is connected to a conductor 158 which terminates in a stationary contact 159. The contact 148 is connected to a conductor 160 which, in turn, is connected at its other end to the flame sensor 115. The flame sensor normally is in engagement with stationary contact 159 and, when it senses ignition of the gas and air mixture provided to the burner 26, it moves from contact 159 to contact 157.

For a typical cycle of operation the user would load the drum 8 with fabrics and close the door 3, closing the door switch 129. The user then would load the drum 8 with fabrics and close the door 3, closing the door switch 129. The user then would adjust the control knob 6 to correspond to the size of load being dried and push in on the push-to-start switch 135. Initially, the start winding 127 and run winding 126 are energized in parallel from conductor 124 through switch 135 to the windings. From the windings the circuit extends through conductor 128 and door switch 129 to conductor 125.

As the motor comes up to speed, the motor speed responsive device 130 moves arm 131 from contact 133 to contact 134. This connects the main winding to conductor 124 through contact 137 and switch arm 138 and disconnects the start winding. The motor speed responsive device also closes arm 132 into engagement with contact 141 to energize the heating circuit. Initially this circuit extends through the inlet thermostat and blower thermostat to the conductor 144 and through the heater 145 and bimetal arm 146 to the contact 148. The flame sensor 115 initially is in engagement with stationary contact 159 so as to bypass the dropping resistance 151 and apply full vontage to solenoid coil 153, opening it, and to apply full voltage to the spark igniter 31, causing it to operate. From contact 148 a circuit also extends through the bimetal valve heater 109 and the thermistor 123 back to the control switch 118. From the control switch 118 a circuit is completed back to the supply conductor 124. Therefore, very quickly after the motor has come up to speed, both the solenoid valve 63 and the bimetal valve 64 open and gas flows to the burner 26. This gas is mixed with primary air and is ignited by the action of the igniter 31 in the well-known manner to provide a flame for heating the air being drawn into the machine.

As soon as the gas and air mixture is ignited, the flame sensor 115 moves from contact 159 to contact 157. This forms a bypass circuit around warp switch 147 and prevents the warp switch bimetal 146 from moving from contact 148 to contact 149. In the event that there was a malfunction and ignition did not occur, after a short period of operation the heater 145 would cause the bimetal 146 to move from the contact 148 to the contact 149. This would deenergize both the bimetal heater 109 and the solenoid coil 153 so that their valves would close and stop the gas flow.

The dryer continues to operate under the control of the control switch 118 and the thermistor 123 to provide an average wattage to the bimetal heater 109 which is responsive to the temperature of the fabrics being dried and thus responsive to their degree of dryness. It will be noted that the connection for the solenoid coil now is from contact 148 through conductor 150 and dropping resistor 151 to the conductor 152. Then from the conductor 152 the circuit extends through the coil 153 to the supply conductor 124 and the circuit from the igniter extends from conductor 152 to the conductor 124. The dropping resistance effectively drops the voltage level at conductor 152 to a value which is sufficient to hold the solenoid valve open without over heating it and is low enough to cause the spark igniter to cease operation to prevent undue wear of that component.

As the fabrics in the machine become drier, their temperature rises and the resistance of the thermistor 123 drops so that less and less voltage, and thereby less and less power, is applied to the bimetal heater 109. Also, the switch 118 may be cycled on and off to further reduce the effective wattage at the heater 107. This causes the inner valve portion to move closer to the inner seat 81 and reduces the gas flow.

As the fabrics approach the desired degree of dryness, the average power applied to the heater 109 becomes insufficient to hold the bimetal valve open and it snaps closed, stopping the gas flow. This extinguishes the flame and the flame sensor switches from contact 157 to contact 159. This reenergizes the warp switch 147 so that shortly thereafter the heater 145 will cause the bimetal arm 146 to move from contact 148 to contact 149. This movement of the arm 146 completely deenergizes the bimetal valve, the solenoid valve, and the spark igniter. It also completes the circuit for the timer motor 139. The timer motor rotates for a predetermined period while the main motor continues to rotate to provide a cool-down operation so that the temperature of the fabrics being treated is reduced to a level comfortable for handling. Then the timer motor causes the arm 138 to move from the contact 137 to the contact 140. This disconnects the main motor so that it ceases to rotate, stopping both the blower and the drum. It also completes a circuit from conductor 125 through an annunciator or buzzer 161, contact 140 and arm 138 to conductor 124. This causes the annunciator or buzzer to sound, informing the user that the cycle is complete. After a few seconds of this operation, the timer motor returns the arm 138 to the contact 137. This effectively deenergizes the entire system because the main motor 56 has stopped and moved the arm 131 back to the position shown in the drawing.

While foregoing is a description of the presently preferred embodiment of the invention, it is applicant's intention in the appended claims to cover all equivalent forms and variations which fall within the true spirit and scope of the invention.

What is claimed as new and desired to be secured by Letters Patent of the United States is:

1. For use with a fluid fueled heating device including a valve for controlling the fluid flow; a control arrangement for the valve, comprising:
   (a) a bimetal actuator positioned to move the valve between open and closed positions, including electrically operated heating means for causing deflection of said bimetal;
   (b) a circuit for connecting said heating means to a source of electric energy;
   (c) a variable resistance connected in said circuit in parallel circuit relation with said heating means and impedance means connected in said circuit in series with the parallel connection of said resistance and said heating means;
   (d) said resistance being positioned to sense a temperature responsive to the material being heated and having a value inversely proportional to the temperature sensed; whereby the voltage across said heating means is decreased to thereby cause the valve to move toward its closed position as the temperature of the heated material rises.

2. The invention as set forth in claim 1 wherein said resistance is a negative coefficient thermistor.

3. The invention as set forth in claim 1 wherein said impedance means includes a control switch including a movable bimetal arm and an arm heater means connected in series with said actuator and resistance; said arm heater means, when energized, causing said arm to open said switch for disconnecting said circuit from the source of electric energy; said arm thereafter cooling and reclosing said switch; thereby modulating said valve.

4. The invention as set forth in claim 3 wherein said switch further includes another movable arm adjustable relative to said bimetal arm for adjusting the opening time of said switch in relation to the closing time of said switch.

5. For use with a fluid fueled heating device including a valve for controlling the fluid flow; a control arrangement for the valve, comprising:
   (a) a bimetal actuator for moving the valve between open and closed positions, including electrically operated heating means for causing deflection of said bimetal;
   (b) a circuit for connecting said heating means to a source of electric energy;
   (c) a control switch, including a movable bimetal arm and arm heater means connected in said circuit in series with said actuator;
   (d) said arm heater means, when energized, causing said arm to open said switch for disconnecting said circuit from the source of electric energy; said arm thereafter cooling and reclosing said switch; thereby modulating said valve.

6. The invention as set forth in claim 5 wherein said switch further includes another movable arm adjustable relative to said bimetal arm for adjusting the opening time of said switch in relation to the closing time of said switch.

7. The invention as set forth in claim 5 wherein a variable resistance is connected in said circuit in parallel with said actuator heating means and position to sense a temperature responsive to the material being heated and having a valve inversely proportional to the temperature sensed; whereby the effective voltage across said actuator heating means is decreased and the effective voltage across said arm heater means is increased as the temperature of the material rises.

8. For use with a fabric drying machine including a revolvable drum to receive fabrics to be dried; means for causing a stream of drying air to pass through the drum, and gas fueled burner for heating the air before it enters the drum; a gas flow control arrangement for regulating the flow of gas to the burner, including:
   (a) a first valve for controlling the flow of gas to the burner;
   (b) a bimetal actuator for moving the valve between open and closed positions, including electrically operated heating means for causing deflection of said bimetal;
   (c) a circuit for connecting said heating means to a source of electric energy;
   (d) a control switch, including a movable bimetal arm and arm heater means connected in said circuit in series with said actuator;
   (e) said arm heater means, when energized, causing said arm to open said switch for disconnecting said circuit from the source of electric energy; said arm thereafter cooling and reclosing said switch; thereby modulating said valve.
   (f) and a variable resistance connected in said circuit in parallel with said actuator heating means and positioned to sense a temperature responsive to the temperature of the fabrics being dried;
   (g) said resistance having a value inversely proportional to the temperature of the fabrics; so that the effective voltage across said actuator heating means is decreased and the effective voltage across said switch is increased as the temperature of the fabrics rises;
   (h) whereby the amount of gas provided to the burner is decreased as the temperature of the fabrics increases.

9. The invention as set forth in claim 8 wherein said switch further includes another movable arm adjustable relative to said bimetal arm for adjusting the opening time of said switch in relation to the closing time of said switch.

10. The invention as set forth in claim 8 further including:
    (a) a second valve connected in series with said bimetal valve in the gas flow path;
    (b) said second valve having an electrically energized operator connected in said circuit in parallel with said actuator heating means and said control switch;
    (c) initial energization of said circuit causing both of said valves to open to provide gas to said burner; and
    (d) said first valve being constructed so that, upon the fabrics reaching a predetermined temperature, the effective voltage across said actuator heating means is decreased to a level to cause said first valve to close and interrupt the gas flow.

11. The invention as set forth in claim 10 further including:
    (a) an electrically energized igniter for gas at the burner connected in said circuit in parallel with said second valve;
    (b) a dropping resistance connected in said circuit in series with said second valve and said igniter;
    (c) a flame detector switch positioned to sense ignition of the gas at the burner;
    (d) said detector switch having a first position, in the absence of ignition, effective to bypass said dropping resistance and apply maximum voltage to said second valve and said igniter;
    (e) said detector switch having a second position, upon ignition, for causing said second valve and said igniter to be connected through said dropping resistance for reducing the voltage applied thereto to a value effective to maintain said second valve open and interrupt operation of said igniter.

12. The invention as set forth in claim 11, wherein said circuit further includes:
    (a) a warp switch normally having a first position in series with said valves and igniter;
    (b) said warp switch having a second position disconnecting said valves and igniter from the source of electric energy, said warp switch being constructed to move to its second position a predetermined period after energization thereof;

(c) said detector switch, in its first position allowing effective connection of said warp switch in said circuit and, in its second position effectively bypassing said warp switch;

(d) whereby said warp switch is effective to deenergize said valves after a predetermined period of said detector switch indicating no ignition.

References Cited

UNITED STATES PATENTS

| 3,252,227 | 5/1966 | Fleer | 34—45 |
| 3,317,136 | 5/1967 | Stang et al. | 251—130 X |

JOHN T. CANBY, Primary Examiner

U.S. Cl. X.R.

251—130